T. L. BURTON.
BRAKE BEAM WITH REMOVABLE TRUNNION.
APPLICATION FILED SEPT. 15, 1916.
1,307,618.
Patented June 24, 1919.
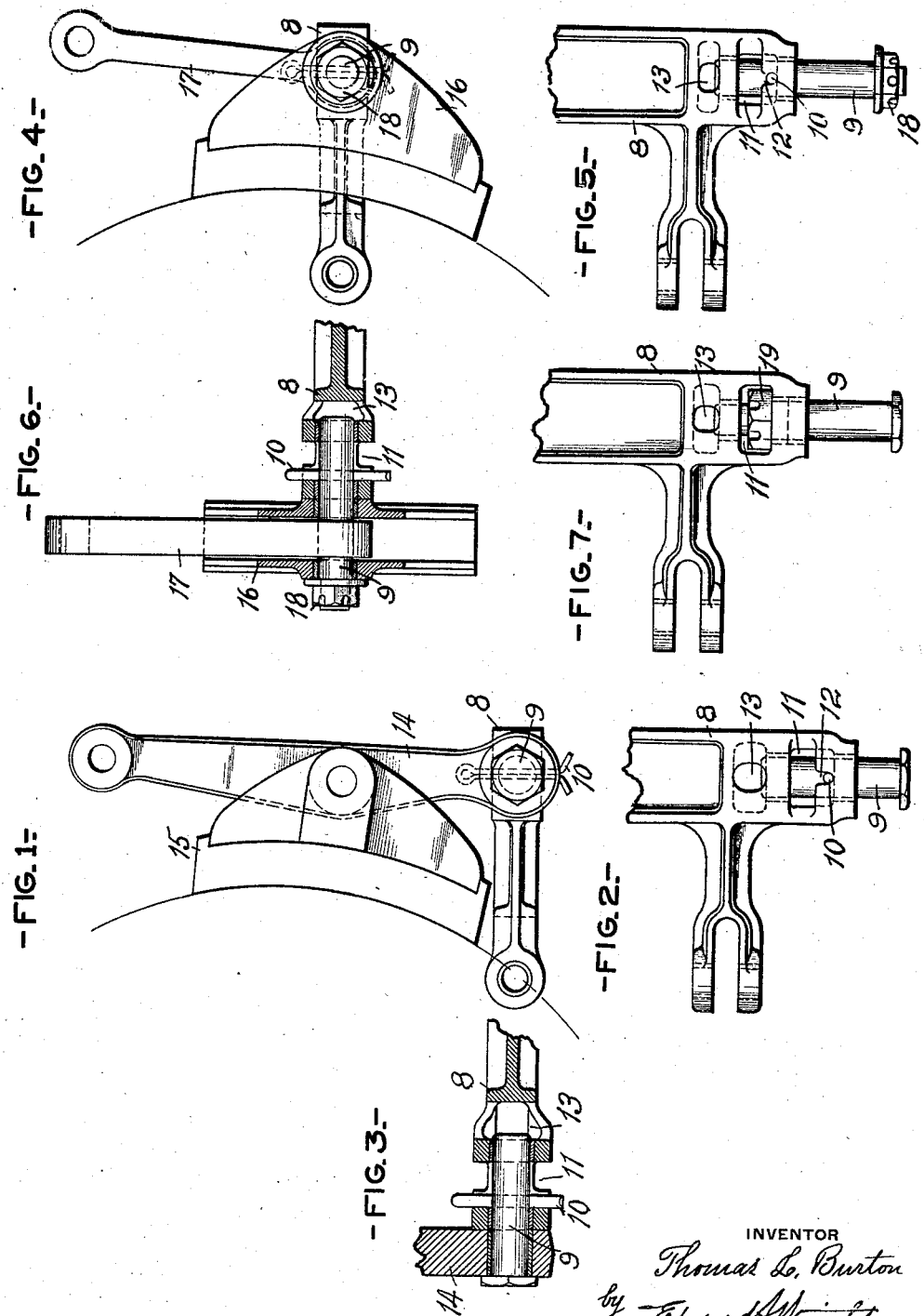
INVENTOR
Thomas L. Burton
by Edward R. Wright.
Atty.

UNITED STATES PATENT OFFICE.

THOMAS L. BURTON, OF ST. LOUIS, MISSOURI, ASSIGNOR TO THE AMERICAN BRAKE COMPANY, OF ST. LOUIS, MISSOURI, A CORPORATION OF MISSOURI.

BRAKE-BEAM WITH REMOVABLE TRUNNION.

1,307,618.  Specification of Letters Patent.  Patented June 24, 1919.

Application filed September 15, 1916. Serial No. 120,227.

*To all whom it may concern:*

Be it known that I, THOMAS L. BURTON, a citizen of the United States, residing at St. Louis, in the State of Missouri, have invented a certain new and useful Improvement in Brake-Beams with Removable Trunnions, of which improvement the following is a specification.

This invention relates to brake beams, and has for its object to provide improved removable trunnions at the ends of the beam for pivotally connecting the same to a brake head, hanger, or lever.

In the accompanying drawings: Figure 1 is a side view, showing a brake beam in end elevation, attached at the lower end of a hanger lever; Fig. 2, a plan; and Fig. 3, a longitudinal section of one end of the brake beam showing one form of removable trunnion; Figs. 4, 5 and 6, views, corresponding to the respective Figs. 1, 2 and 3, but showing a modification in which the brake beam is connected to a brake head and hanger by means of the removable trunnion; and Fig. 7, a plan of the end of a beam showing a modified fastening means for the removable trunnion.

According to my improvement, the trunnions are formed of pieces separate from the beam, and are detachably connected thereto at the opposite ends, whereby the trunnion pieces may be removed when necessary for renewal or for changing the parts for the purpose of applying longer or shorter trunnions according to the thickness of the brake heads or hangers to which they are attached.

As shown in the drawing, the brake beam, 8, is provided at each end with a longitudinal opening formed in line with the axis of the beam, and into which is inserted the trunnion piece, 9, which may be secured in position by a cotter pin, 10, passing vertically through the beam and the trunnion piece. The end of the beam where the trunnion is inserted is also preferably provided with a vertical or transverse slot or opening, 11, containing a notch, 12, for the reception of the cotter, 10. Another vertical opening, 13, may also be formed in the beam at the inner end of the trunnion piece for the purpose of facilitating the removal of the trunnion when it is desired to renew or replace the same.

As shown in Figs. 1, 2 and 3, the trunnion is provided with a rigid head, and is connected to the hanger lever, 14, carrying the brake shoe, 15. With this construction, it is necessary to remove the cotter and detach the trunnion from the beam when it is desired to disconnect the hanger lever from the beam.

According to the construction shown in Figs. 4, 5 and 6, a longer trunnion is provided for extending through the brake head, 16, and hanger, 17, and a nut, 18, is threaded upon the end of the trunnion. The nut serves not only to hold the parts in position, but may also be adjusted to clamp the brake head between the washer of said nut and the shoulder at the end of the brake beam with sufficient pressure to form a frictional engagement and maintain the desired relationship between the brake head and the brake beam. As the brake beams are properly supported, this connection will insure having the faces of brake shoes substantially concentric with the wheels when the brake is released, and maintain the desired clearance between the shoe and wheel throughout the full length of the shoe and under the various conditions of wear. With this form of construction, the brake head and hanger may be readily detached by simply removing the nut without detaching the trunnion from the beam.

In the modification shown in Fig. 7, a nut, 19, is mounted on the trunnion piece, 9, within the opening, 11, in the brake beam. This serves to fasten the trunnion in position, and may also be adjusted to clamp the brake head with a frictional engagement between the head of the trunnion and the shoulder at the end of the brake beam with the same advantages as above described in connection with the modification shown in Figs. 4, 5 and 6.

Having now described my invention, what I claim as new and desire to secure by Letters Patent is:

1. A brake beam having longitudinal openings formed in its ends, removable trunnions inserted in said openings, said beam having transverse slots near the ends, and fastening means therein for holding the trunnions in place, said beam also having other transverse slots at the inner ends of the trunnions.

2. A brake beam having longitudinal openings formed in its ends, removable trunnions inserted in said openings, said beam also having transverse slots provided with notches, and cotter pins in said notches for fastening the trunnions.

3. A brake beam having longitudinal openings formed in its ends, removable trunnions inserted in said openings, said beams also having transverse openings 13 at the inner ends of the trunnion pieces, and means for fastening said trunnions in the beam.

In testimony whereof I have hereunto set my hand.

THOMAS L. BURTON.

Copies of this patent may be obtained for five cents each, by addressing the "Commissioner of Patents, Washington, D. C."